United States Patent
Ahn et al.

(10) Patent No.: US 8,421,610 B2
(45) Date of Patent: Apr. 16, 2013

(54) TOUCH SCREEN AND METHOD OF OPERATING THE SAME

(75) Inventors: Seongdeok Ahn, Daejeon (KR); In-Kyu You, Daejeon (KR); Jiyoung Oh, Daejeon (KR); Chul Am Kim, Seoul (KR); Jae Bon Koo, Daejeon (KR); Sang Seok Lee, Daejeon (KR); Kyung Soo Suh, Daejeon (KR); Kyoung Ik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 874 days.

(21) Appl. No.: 12/534,672

(22) Filed: Aug. 3, 2009

(65) Prior Publication Data

US 2010/0141411 A1   Jun. 10, 2010

(30) Foreign Application Priority Data

Dec. 8, 2008  (KR) .................. 10-2008-0123997
Mar. 19, 2009  (KR) .................. 10-2009-0023364

(51) Int. Cl.
*G08B 6/00* (2006.01)

(52) U.S. Cl.
USPC .............. 340/407.2; 341/27; 341/32; 341/34; 345/156; 345/173

(58) Field of Classification Search ............... 340/407.1, 340/407.2; 434/113, 114; 345/173, 174, 345/179, 156; 341/20, 27, 32, 33, 34
See application file for complete search history.

(56) References Cited

U.S. PATENT DOCUMENTS

| | | | |
|---|---|---|---|
| 7,436,396 B2 * | 10/2008 | Akieda et al. | 345/173 |
| 2005/0231313 A1 * | 10/2005 | Shahoian | 335/220 |
| 2008/0126975 A1 * | 5/2008 | Vassigh et al. | 715/772 |
| 2010/0045612 A1 * | 2/2010 | Molne | 345/173 |
| 2010/0182245 A1 * | 7/2010 | Edwards et al. | 345/173 |
| 2011/0205446 A1 * | 8/2011 | Hardacker et al. | 348/734 |

FOREIGN PATENT DOCUMENTS

| | | |
|---|---|---|
| EP | 1544727 A1 | 6/2005 |
| JP | 2005-4274 A | 1/2005 |
| JP | 2006-146611 A | 6/2006 |
| KR | 2006-0135622 A | 12/2006 |
| KR | 2007-0011450 A | 1/2007 |
| KR | 10-2010-0036651 A | 4/2010 |

OTHER PUBLICATIONS

Hyung-Kew Lee et al. "A Flexible Polymer Tactile Sensor: Fabrication and Modular Expandability for Large Area Deployment" Journal of Microelectromechanical Systems, vol. 15, No. 6, Dec. 2006, pp. 1681-1686.

* cited by examiner

*Primary Examiner* — Brent Swarthout
(74) *Attorney, Agent, or Firm* — Rabin & Berdo, P.C.

(57) ABSTRACT

Provided are a touch screen and a method of operating the same. The touch screen includes a detecting part, a control part, and a tactile feedback part. The detecting part detects object's approach or contact. The control part receives a signal of the detecting part to output a feedback signal. The tactile feedback part receives the feedback signal of the control part to provide a tactile feedback to a contact position using a magnetic force. The tactile feedback uses the magnetic force of a magnetic dipole.

4 Claims, 5 Drawing Sheets

TOUCH SCREEN AND METHOD OF OPERATING THE SAME

CROSS-REFERENCE TO RELATED APPLICATIONS

This U.S. non-provisional patent application claims priority under 35 U.S.C. §119 of Korean Patent Application Nos. 10-2008-123997, filed on Dec. 8, 2008, and 10-2009-0023364, filed on Mar. 19, 2009, the entire contents of which are hereby incorporated by reference.

BACKGROUND OF THE INVENTION

The present invention disclosed herein relates to a touch screen device, and more particularly, to a touch screen in which a repulsive force using magnetic force is applied to provide tactile feedback to a user when the user touches the touch screen with the fingers and contacts an object.

Various display applications that are being introduced for personal digital assistants (PDAs) and portable devices, global positioning systems (GPSs), computer systems such as laptops, kiosks, check-in terminals, and navigation systems include a touch screen on a display panel. A user checks an icon or graphics for a data item or operation through the touch screen. When a finger of the user presses the touch screen, the data item or operation may be selected.

Touch screens may be classified into capacitive touch screens, resistive touch screens, touch screens in which tempered glass is adhered to a capacitive touch screen to improve strength of a sensor, resistive overlay touch screens, surface acoustic wave touch screens, ultrasonic touch screens, resistive overlay touch screens, and piezoelectric touch screens.

Tactile sensations that are felt when human fingertips touch an object are referred to as "haptic". The term includes tactile feedback that is felt when skin contacts a surface of an object and kinesthetic force feedback that is felt when movements of joints and muscles are impeded.

Tactile feedback uses vibration components for transmitting vibration to a user. Various products that can provide tactile feedback to a user through the use of only a simple vibrating device are being introduced. However, since the products generate vibration using a built-in eccentric motor, vibration is not localized to only a point pressed by the finger, but occurs in a single pattern throughout a portable terminal. Therefore, consumers need products that employ a feedback technique that can provide a more realistic feel to a user. Various techniques are thus being used.

SUMMARY OF THE INVENTION

The present invention provides a touch screen that provides a tactile feedback using a magnetic force.

The present invention also provides a method of operating a touch screen that provides a tactile feedback using a magnetic force.

Embodiments of the present invention provide touch screens including: a detecting part detecting object's approach or contact; a control part receiving a signal of the detecting part to output a feedback signal; and a tactile feedback part receiving the feedback signal of the control part to provide a tactile feedback to a contact position using a magnetic force, wherein the tactile feedback uses a magnetic dipole.

In some embodiments, the tactile feedback part may include: a first magnetic part; and a second magnetic part spaced apart from the first magnetic part, wherein the first magnetic part and/or the second magnetic part may include a coil.

In other embodiments, the tactile feedback part may include: a first magnetic part; and a second magnetic part spaced apart from the first magnetic part, wherein the second magnetic part may include a permanent magnet.

In still other embodiments, the detecting part may use one of a resistive, capacitive, infrared beam, and surface acoustic wave methods.

In even other embodiments, the detecting part may include: a lower substrate; a lower electrode on the lower substrate; an upper substrate facing the lower substrate; an upper electrode disposed on a bottom surface of the upper substrate; and a spacer between the lower substrate and the upper substrate to space the lower substrate from the upper substrate by a predetermined distance, wherein the tactile feedback part is disposed between the lower substrate and the upper substrate.

In yet other embodiments, the tactile feedback part may include: a first magnetic part; and a second magnetic part spaced apart from the first magnetic part.

In further embodiments, the first magnetic part may be disposed on the lower electrode, and the second magnetic part may be disposed on a bottom surface of the lower electrode.

In still further embodiments, the first magnetic part may be disposed on the lower substrate around the lower electrode, and the second magnetic part may be disposed on the bottom surface of the upper around the upper electrode.

In even further embodiments, the touch screen may be disposed on a display device.

In other embodiments of the present invention, touch screens include: a detecting part detecting object's approach or contact; a control part receiving a signal of the detecting part to output a feedback signal; and a tactile feedback part receiving the feedback signal of the control part to provide a tactile feedback to a contact position using a magnetic force. The tactile feedback may use a magnetic dipole. Methods of operating the touch screen include: detecting the object's approach or contact; determining whether the object contacts and detecting a contact position; and providing a tactile feedback to the contact position.

In some embodiments, the providing of the tactile feedback to the contact position may include: providing a first tactile feedback to the contact position; determining whether the contact is continuously maintained; and providing a second tactile feedback to the contact position.

In other embodiments, the first tactile feedback may include an attractive force.

In still other embodiments, the second tactile feedback may include a repulsive force.

In even other embodiments, the methods of operating the touch screen may include controlling a display panel corresponding to the contact position.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

According to typical methods, a touch screen device that can provide a tactile feedback using a method except vibration methods does not exist at all. Most of the products to be merchandised currently provide the tactile feedback using the vibration methods. However, there is a limitation that most people feel discomfort by using such a vibration feedback as the tactile feedback.

A touch screen according to an embodiment of the present invention may include a tactile feedback part to generate a vibration or pressure as the tactile feedback at only a contact point. The tactile feedback part may locally provide an attractive force, a repulsive force, and a vibration using a magnetic force.

Hereinafter, a touch screen using magnetic substances having the same polarity facing each other and a structure and operation of the touch screen that provides a tactile feedback using the magnetic substances will be described in detail with reference to the accompanying drawings.

Figure 1:
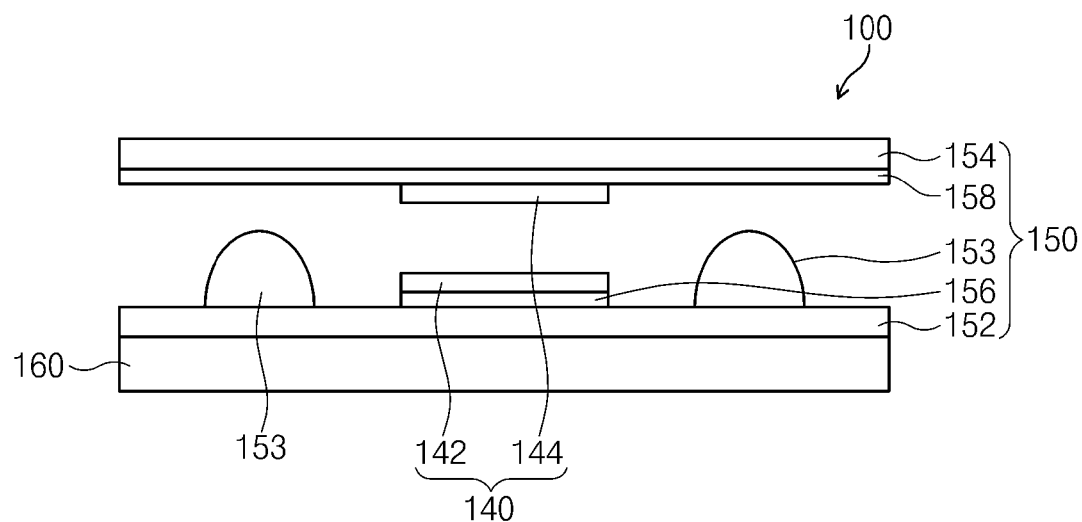
FIG. 1 is a cross-sectional view of a touch screen according to an embodiment of the present invention.

FIG. 1 is a cross-sectional view of a touch screen according to an embodiment of the present invention.

Referring to FIG. 1, a touch screen 100 includes a detecting part 150, a control part (not shown), and a tactile feedback part 140. The detecting part 150 detects object's approach or contact. The control part receives a signal of the detecting part 150 to output a feedback signal. The tactile feedback part 140 receives the feedback signal of the control part to provide a tactile feedback using a magnetic force at a contact position. The tactile feedback is provided by using a magnetic force of a magnetic dipole.

The detecting part 150 may include a lower substrate 152, an upper substrate 154, and a spacer 153 disposed between the lower substrate 152 and the upper substrate 154. The spacer 153 may be disposed on a top surface of the lower substrate 152. Thus, the lower substrate 152 may be spaced a predetermined distance from the upper substrate 154. An operation method of the detecting part 150 is not limited to a capacitive method, but may be variously modified.

The lower substrate 152 may be formed of a transparent glass, plastic or polymer material. A display panel 160 may be disposed on a bottom surface of the lower substrate 152. A lower electrode 156 may be disposed on the top surface of the lower substrate 152. The lower electrode 156 may be formed of a transparent conductive material. The lower electrode 156 may be patterned in a line shape along a first direction. The lower electrode 156 may be formed of transparent conductive oxide (TCO). For example, the lower electrode 156 may be formed of at least one of indium tin oxide (ITO), tin antinomy oxide (TAO), tin oxide (TO), zinc oxide (ZnO), indium zinc oxide (IZO), and carbon nanotube (CNT) film.

The upper substrate 154 may be formed of a transparent glass, plastic or polymer material. An upper electrode 158 that is a signal electrode may be disposed on a bottom surface of the upper substrate 154 facing the top surface of the lower substrate 152. The upper electrode 158 may be formed of a transparent conductive material. The upper electrode 158 may be patterned in a ling shape along a second direction crossing the first direction. The upper substrate 154 may have expansibility to expand when a pressure is applied to it. In the touch screen 100, the detecting part 150 is disposed on a top surface of the display panel 160. A contact point between the upper electrode 158 and the lower electrode 156 may form a node.

The spacer 153 may be disposed on the top surface of the lower substrate 152. The spacer 153 may be disposed between the lower electrode 156 disposed on the lower substrate 152 and an adjacent lower electrode 156 by a predetermined distance. The spacer 153 may be formed of a transparent material. The spacer 153 may have an electrical insulating property. The spacer 153 may be disposed between the bottom surface of the upper substrate 154 and the top surface of the lower substrate 152 to space the upper substrate 154 from the lower substrate 152. Thus, the upper substrate 154 and the lower substrate 152 may be maintained to the predetermined distance.

The control part detects a change of an electrostatic capacity between the upper electrode 158 and the lower electrode 156 to calculate the contact position.

According to a modified embodiment of the present invention, the upper electrode 158 and the lower electrode 156 may have a plate shape. A structure of the detecting part 150 may be variously modified according to their type.

The tactile feedback part 140 may use an interaction between two magnetic dipole moments. The tactile feedback part 140 may include a first magnetic part 142 and a second magnetic part 144 which are spaced apart from. The first magnetic part 142 may include a first coil. The second magnetic part 144 may include a permanent magnet or a second coil. The permanent magnet may be treated as a magnetic dipole. The permanent magnet may be replaced with the second coil having the same magnetic dipole moment. When a current flows into the first coil of the first magnetic part 142, the first magnetic part 142 may interact with the second magnetic part 144. The permanent magnet may include a transparent magnet. The transparent magnet may include a titanium dioxide cobalt magnetic film. The first coil or the second coil may be formed of a transparent conductive material.

A mutual inductance L12 between the first magnetic part 142 and the second magnetic part 144 may be expressed as Equation (1).

$$L_{12} = \frac{\mu_0}{4\pi} \oint_{C_1} \oint_{C_2} \frac{d\vec{l}_1 \cdot d\vec{l}_2}{R_{12}} \quad (1)$$

The first magnetic part 142 and the second magnetic part 144 may be spaced a predetermined perpendicular distance from. A interacting force between the first magnetic part 142 and the second magnetic part 144 may be obtained based on a virtual displacement principle.

In a structure of the tactile feedback part 140, two coils are may be spaced apart from. The interacting force between the first magnetic part 142 and the second magnetic part 144 may be an attractive force or a repulsive force according to current directions of the coils. When the first magnetic part 142 is disposed on the lower substrate 152, and the second magnetic part 144 is disposed on the upper substrate 154, the interacting force between the magnetic part 142 and the second magnetic part 144 may locally provide the attractive force, the repulsive force, or a vibration.

The second magnetic part 144 may be spaced apart from the first magnetic part 142. The first magnetic part 142 may be disposed on the lower electrode 156. The first magnetic part 142 may include the first coil. The first coil may be formed of a transparent conductive material. The first magnetic part 142 and the second magnetic part 142 may be electrically insulated from each other. A direction of the magnetic dipole moment of the first magnetic part 142 may be parallel to that of the second magnetic part 144.

The second magnetic part 144 may be disposed on the bottom surface of the upper electrode 158. The second magnetic part 144 may include the permanent magnet and the second coil. The permanent magnet may include a transparent magnet. A magnetization direction of the permanent magnet may be perpendicular to a plane of the upper substrate 154. The second coil may be formed of a transparent conductive material. The second magnetic part 144 may be electrically insulated from the upper electrode 158. The second magnetic part 144 may be formed of a material having elasticity. When a pressure is applied to the upper substrate 154, the upper electrode 158 and the second magnetic part 144 may be curved by the pressure. Thus, the electrostatic capacitance between the upper electrode 158 and the lower electrode 156 may be changed. The change of the electrostatic capacitance may be detected by the control part. The control part may calculate a point to which the pressure is applied and a degree of the change of the electrostatic capacitance. The control part may provide data with respect to a position of the display panel 160. Also, the control part may provide the feedback signal of the tactile feedback part 140. Thus, the feedback signal of the control part may be supplied to the first magnetic part 142. The tactile feedback part 140 may locally provide the tactile feedback at the contact position.

The tactile feedback part 140 may be built in a typical touch screen or touch pad or disposed at an upper portion or a lower portion of the typical touch screen.

Figure 2A:
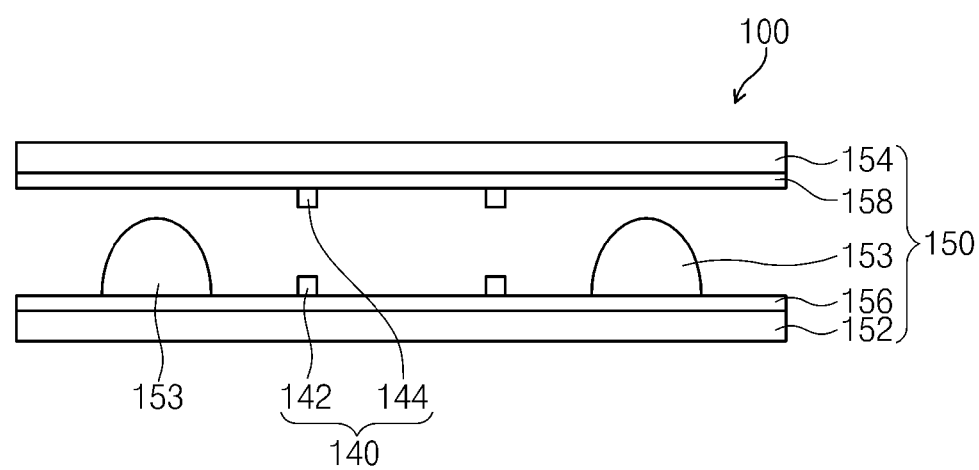
FIGS. 2A to 2C are cross-sectional views of a touch screen according to another embodiment of the present invention.
Figure 2B:
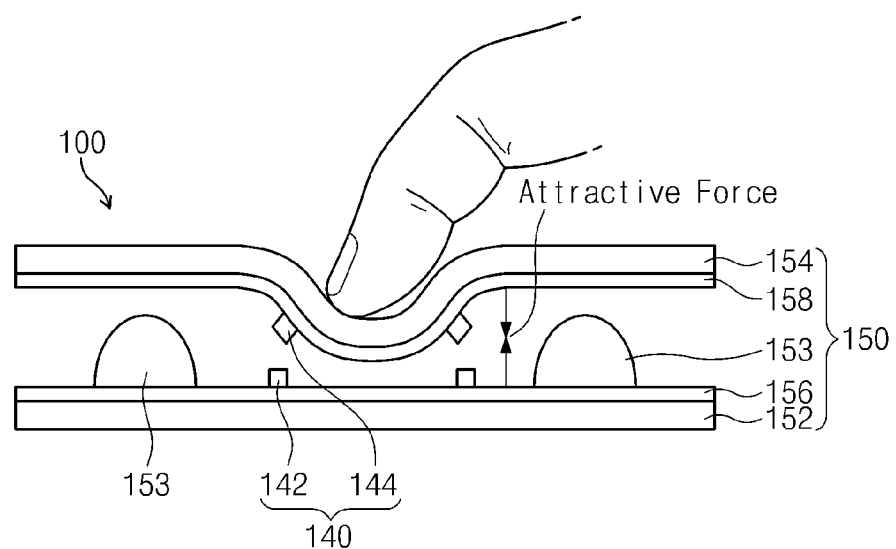
Figure 2C:
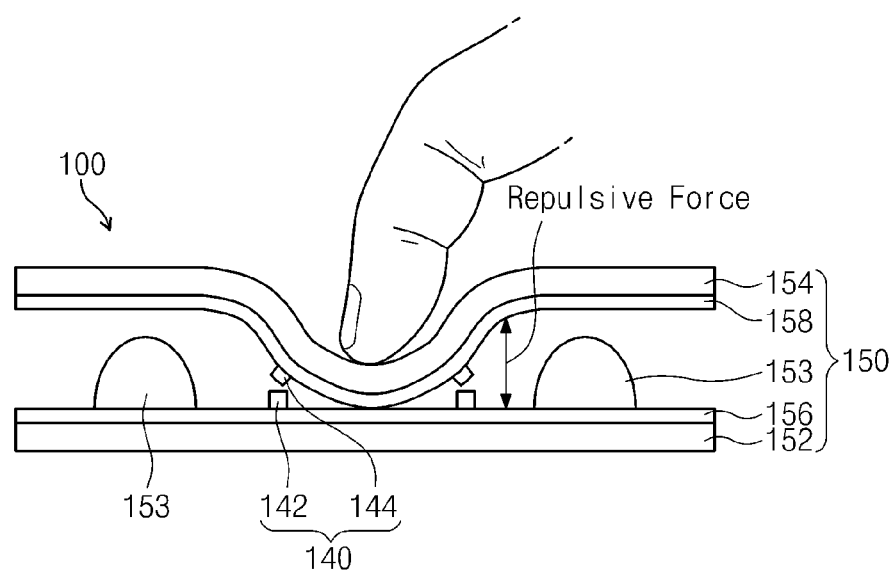

FIGS. 2A to 2C are cross-sectional views of a resistive touch screen according to another embodiment of the present invention.

Referring to FIG. 2A, a touch screen 100 includes a detecting part 150, a control part (not shown), and a tactile feedback part 140. The detecting part 150 detects object's approach or contact. The control part receives a signal of the detecting part 150 to output a feedback signal. The tactile feedback part 140 receives the feedback signal of the control part to provide a tactile feedback using a magnetic force at a contact position. The tactile feedback uses a magnetic force of a magnetic dipole.

The detecting part 150 may include a lower substrate 152, an upper substrate 154, and a spacer 153 disposed between the lower substrate 152 and the upper substrate 154. The spacer 153 may be disposed on a top surface of the lower substrate 152. Thus, the lower substrate 152 and the upper substrate 154 may be maintained at a predetermined distance from each other. A lower electrode 156 may be disposed on the lower substrate 152. An upper electrode 158 may be disposed on a bottom surface of the lower substrate 154. The spacer 153 may be disposed the lower electrode 156. The detecting part 150 may be realized as a resistive overlay technology. The lower electrode 156 and the upper electrode 158 may have a plate shape. Lower electrode pads (not shown) may be disposed on lateral sides of the lower electrode 156. Upper electrode pads (not shown) may be disposed on lateral sides of the upper electrode 158.

The tactile feedback part 140 may include a first magnetic part 142 and a second magnetic part 144, which are spaced apart from each other. The first magnetic part 142 may be disposed on the lower electrode 156. The first magnetic part 142 may be electrically insulated from the lower electrode 156. The second magnetic part 144 may be disposed on a bottom surface of the upper electrode 158. In case where an external force is not applied, the first magnetic part 142 and the second magnetic part 144 may be maintained at a predetermined distance from each other. The second magnetic part 144 may include a permanent magnet. The first magnetic part 142 may include a coil.

Figure 3:
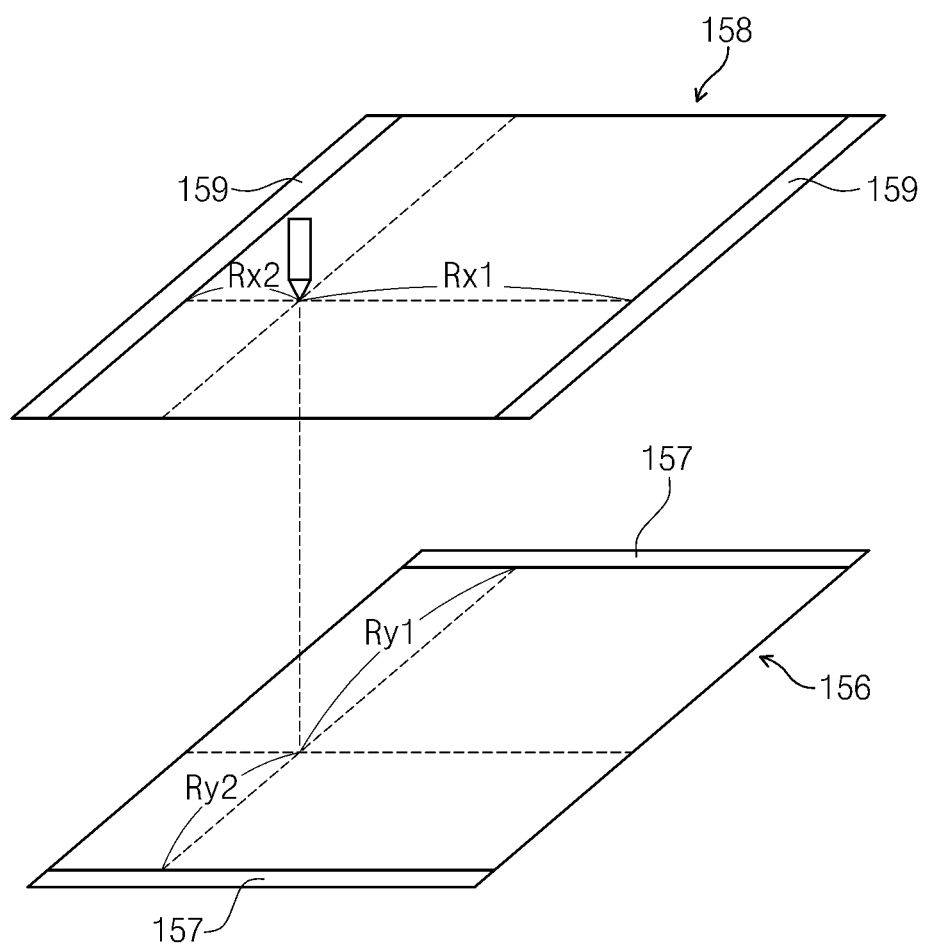
FIG. 3 is a view of a resistive overlay touch screen according to an embodiment of the present invention.

FIG. 3 is a view of a resistive overlay touch screen according to an embodiment of the present invention.

Referring to FIGS. 2B and 3, when a touch event occurs on the upper substrate 154 by a finger, the detecting part 150 may provide the touch event to the control part. Particularly, when the touch event occurs by pressing the finger or a pan, the upper electrode 158 of the upper substrate 154 is in contact with the lower electrode 156 of the lower substrate 152. When a voltage Vx is applied between lower electrode pads 157, a voltage gradient (distribution) is generated on a resistive surface between the lower electrode pads 157. The control part may read the voltage through the lower electrode pads 157 to calculate an input position of a y-axis. Structures of the electrode pads 157 and 159 may be modified to a 5-wire or 8-wire form.

The control part may detect a position at which the touch event occurs to operate the tactile feedback part 140. The tactile feedback part 140 may provide attractive, repulsive, or vibration feedback to the finger.

For example, when the touch event occurs, the control part may transmit a signal for generating an attractive force to the tactile feedback part 140. As a result, the first magnetic part 142 may be in contact with the second magnetic part 144. That is, when the touch event occurs, the finger may very easily detect a sense in which a contact surface is pressed. Particularly, when current flows into the coil of the first magnetic part 142, the attractive force may act between the first magnetic part 142 and the permanent magnet of the second magnetic part 144.

Referring to FIG. 2C, when the upper electrode 158 is in contact with the lower electrode 156, the control part may transmit a signal for generating a repulsive force to the tactile feedback part 140. As a result, the first magnetic part 142 may be away from the second magnetic part 144. Thus, the finger may receive tactile feedback having a strongly repulsive force by the tactile feedback part 140.

The method in which the tactile feedback is provided according to a modified embodiment of the present invention may be variously modified according to their type such as the vibration feedback.

Figure 4:
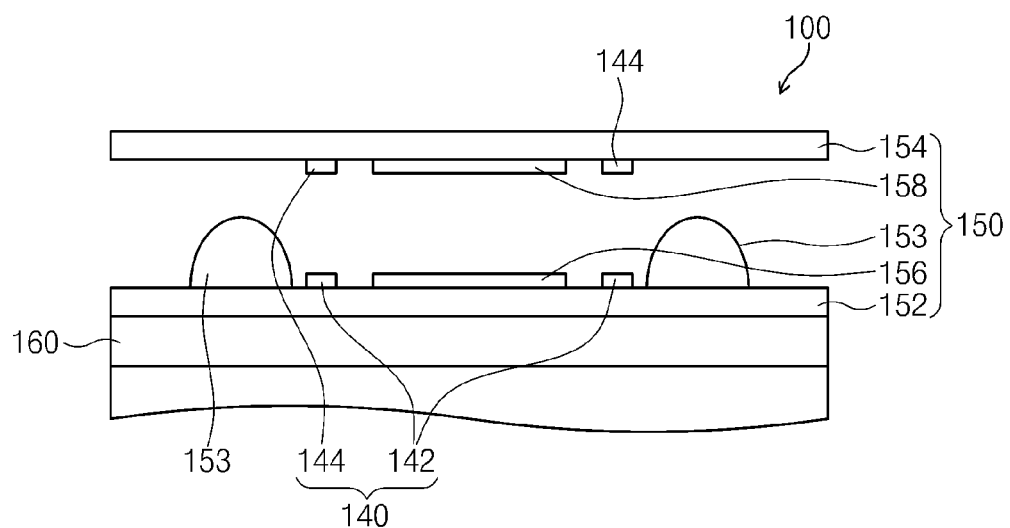
FIG. 4 is a cross-sectional view of a touch screen according another embodiment of the present invention.

FIG. 4 is a cross-sectional view of a capacitive touch screen according another embodiment of the present invention.

Referring to FIG. 4, a touch screen 100 includes a detecting part 150, a control part (not shown), and a tactile feedback part 140. The detecting part 150 detects object's approach or contact. The control part receives a signal of the detecting part 150 to output a feedback signal. The tactile feedback part 140 receives the feedback signal of the control part to provide a tactile feedback using a magnetic force at a contact position. The tactile feedback uses a magnetic force of a magnetic dipole.

The detecting part 150 may include a lower substrate 152, an upper substrate 154, and a spacer 153 disposed between the lower substrate 152 and the upper substrate 154. The spacer 153 may be disposed on a top surface of the lower substrate 152. Thus, the lower substrate 152 and the upper substrate 154 may be maintained at a predetermined distance from each other. A lower electrode 156 may be disposed on the lower substrate 152. An upper electrode 158 may be disposed on a bottom surface of the lower substrate 154. When a touch event occurs, the detecting part 150 may detect a change of an electrostatic capacity between the lower electrode 156 and the upper electrode 158.

The tactile feedback part 140 may include a first magnetic part 142 and a second magnetic part 144, which are spaced from each other. The first magnetic part 142 may be disposed around the lower electrode 156 on the lower substrate 152. The first magnetic part 142 may be electrically insulated from the lower electrode 156. The second magnetic part 144 may be disposed around the upper electrode 158 on a bottom surface of the upper substrate 154.

In the touch screen 100, the detecting part 150 may be disposed on a top surface of a display panel 160.

Figure 5:
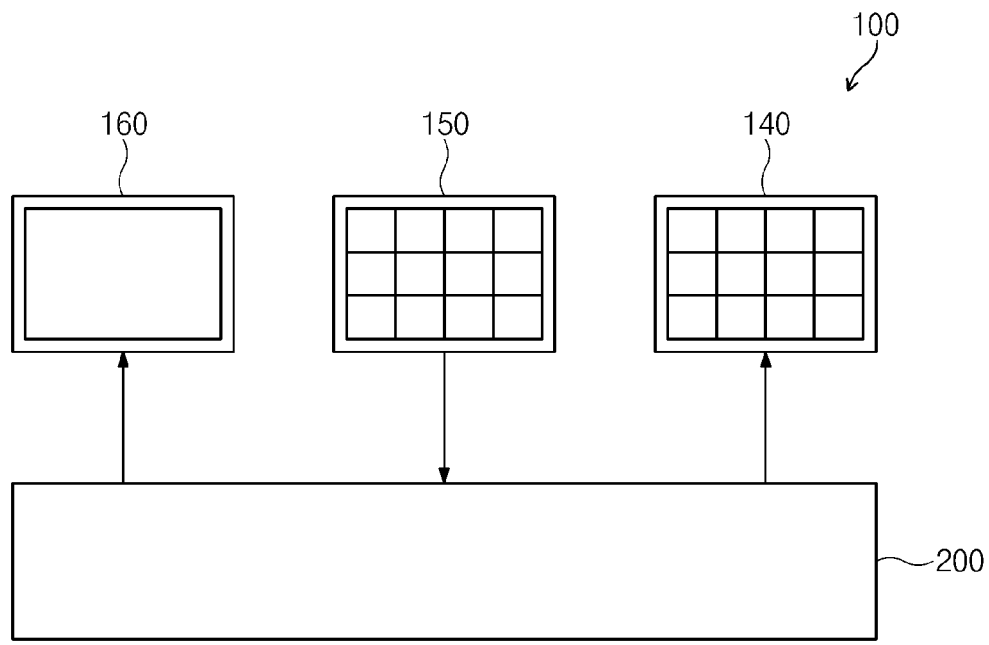
FIG. 5 is a schematic view of a touch screen according to another embodiment of the present invention.

FIG. 5 is a schematic view of a touch screen according to another embodiment of the present invention.

Referring to FIG. 5, a touch screen 100 includes a detecting part 150, a control part 200, and a tactile feedback part 140. The detecting part 150 detects object's approach or contact. The control part 200 receives a signal of the detecting part 150 to output a feedback signal. The tactile feedback part 140 receives the feedback signal of the control part 200 to provide a tactile feedback using a magnetic force at a contact position. The tactile feedback uses a magnetic force of a magnetic dipole.

A user is in contact with the detecting part 150. The control part 200 receives the output signal of the detecting part 150 to calculate whether user's contact is detected and position data and output a feedback signal. When the user's contact is detected, the control part 200 may provide the feedback signal to a display panel 160 and/or a tactile feedback part 140. The tactile feedback part 140 may provide tactile feedback using the feedback signal. The tactile feedback part 140, the detecting part 150, and the display panel 160 may not overlap with each other. The tactile feedback part 140 may be built in the detecting part 150.

Figure 6:
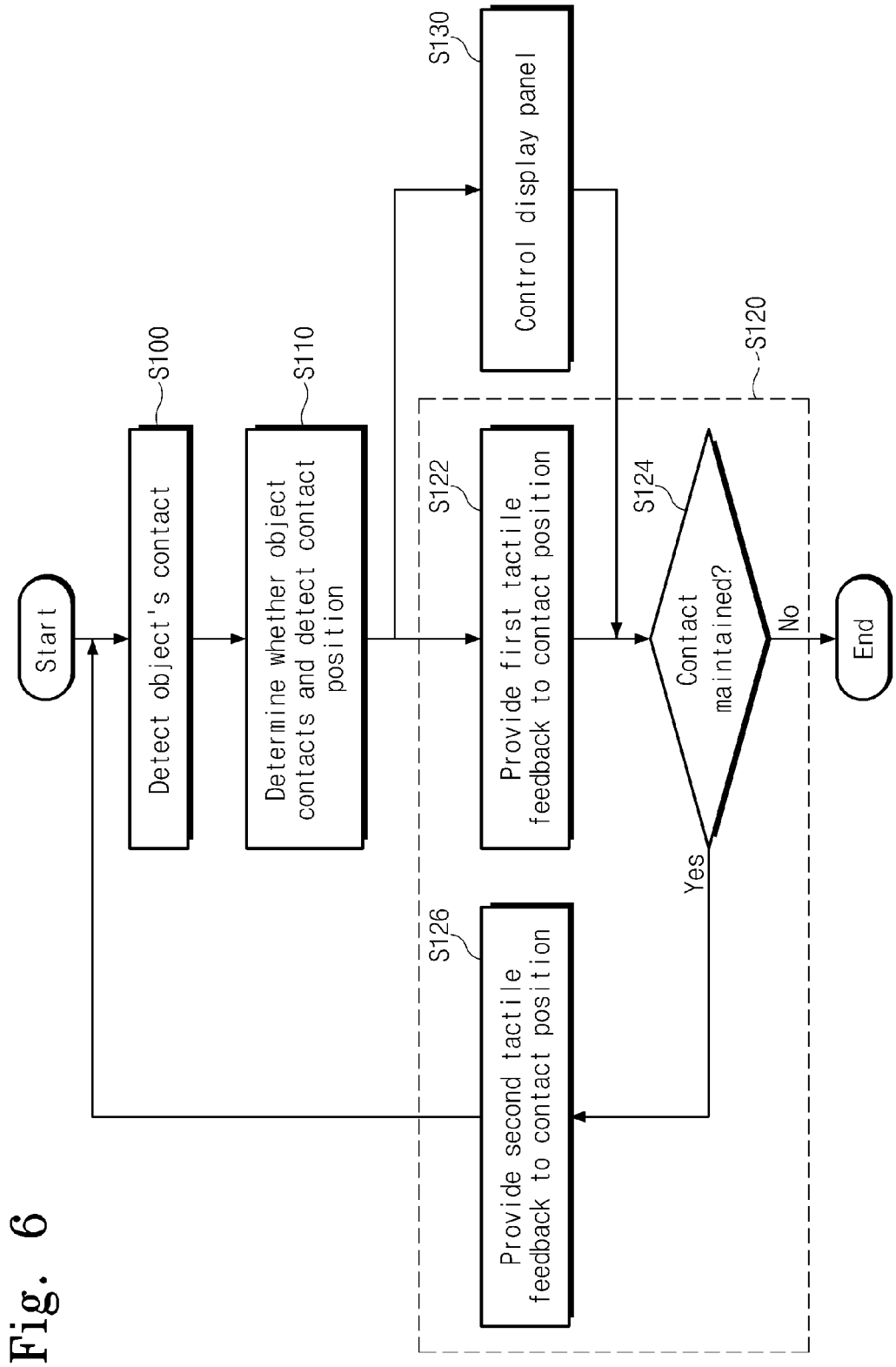
FIG. 6 is a flowchart illustrating a process of operating a touch screen according to an embodiment of the present invention.

FIG. 6 is a flowchart illustrating a process of operating a touch screen according to an embodiment of the present invention.

Referring to FIGS. 5 and 6, the user may be in contact with the detecting part 150. In operation S100, the detecting part 150 may provide an output signal to the control part 200. In operation S110, the control part 200 may detect whether a user is in contact with the detecting part 150 and/or position data of a contact point using the output signal of the detecting part 150. When the user's contact is detected, the control part 200 may provide a tactile feedback to the contact point through the tactile feedback part 140 in operation S120. The tactile feedback may include a first tactile feedback and a second tactile feedback. In operation S122, the first tactile feedback may be an attractive force provided at the contact point when the user's contact is detected. In operation S130, the control part 200 may provide a feedback signal to the display panel 160. The first tactile feedback may be an attractive force in which the contact point is depressed.

In operation S124, the control part 200 may determine whether the user's contact is continuously maintained. When the user's contact is continuously maintained, the control part 200 may provide the second tactile feedback to the user through the tactile feedback part 140 at the contact point in operation S126. The second tactile feedback may be an attractive force or a repulsive force. On the other hand, when the user's contact is finished, the detecting part 150 may be reset to an initial state.

According to the modified embodiment of the present invention, the method in which the tactile feedback is provided using the magnetic force may be variously modified.

The touch screen according to the embodiments of the present invention includes the tactile feedback part that uses the magnetic force, and the tactile feedback part can locally provide the attractive force, the repulsive force, or the vibration.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising
    detecting approach toward or contact with a touch screen of an object;
    based on detecting contact with the touch screen, detecting a contact position;
    providing a first tactile feedback to the contact position;
    determining whether the contact is continuously maintained; and
    based on determining that the contact is continuously maintained, providing a second tactile feedback to the contact position;
    wherein the tactile feedback is locally provided to a portion of a tactile feedback part corresponding to the contact position using a magnetic force of a magnetic dipole.

2. The method of claim 1, comprising providing the first tactile feedback as an attractive force.

3. The method of claim 1, comprising providing a repulsive force as the second tactile feedback.

4. The method of claim 1, further comprising controlling a display panel corresponding to the contact position.

* * * * *